(12) United States Patent
Mitsushima et al.

(10) Patent No.: US 11,692,276 B2
(45) Date of Patent: Jul. 4, 2023

(54) ALKALINE WATER ELECTROLYSIS METHOD, AND ANODE FOR ALKALINE WATER ELECTROLYSIS

(71) Applicants: DE NORA PERMELEC LTD, Fujisawa (JP); KAWASAKI JUKOGYO KABUSHIKI KAISHA, Kobe (JP); NATIONAL UNIVERSITY CORPORATION YOKOHAMA NATIONAL UNIVERSITY, Yokohama (JP)

(72) Inventors: Shigenori Mitsushima, Yokohama (JP); Yoshiyuki Kuroda, Yokohama (JP); Shohei Takatsu, Yokohama (JP); Ikuo Nagashima, Kobe (JP); Tatsuya Taniguchi, Kobe (JP); Akihiko Inomata, Kobe (JP); Ayaka Nagai, Kobe (JP); Yoshinori Nishiki, Fujisawa (JP); Akihiro Kato, Fujisawa (JP); Awaludin Zaenal, Fujisawa (JP); Takaaki Nakai, Fujisawa (JP)

(73) Assignees: DE NORA PERMELEC LTD, Fujisawa (JP); KAWASAKI JUKOGYO KABUSHIKI KAISHA, Kobe (JP); NATIONAL UNIVERSITY CORPORATION YOKOHAMA NATIONAL UNIVERSITY, Yokohama (JP)

( * ) Notice: Subject to any disclaimer, the term of this patent is extended or adjusted under 35 U.S.C. 154(b) by 0 days.

(21) Appl. No.: 17/905,232

(22) PCT Filed: Mar. 8, 2021

(86) PCT No.: PCT/JP2021/008958
§ 371 (c)(1),
(2) Date: Aug. 29, 2022

(87) PCT Pub. No.: WO2021/182385
PCT Pub. Date: Sep. 16, 2021

(65) Prior Publication Data
US 2023/0109702 A1  Apr. 13, 2023

(30) Foreign Application Priority Data
Mar. 9, 2020  (JP) ................. 2020-039838

(51) Int. Cl.
*C25B 11/052* (2021.01)
*C25B 1/04* (2021.01)
(Continued)

(52) U.S. Cl.
CPC .............. *C25B 11/052* (2021.01); *C25B 1/04* (2013.01); *C25B 11/061* (2021.01);
(Continued)

(58) Field of Classification Search
None
See application file for complete search history.

(56) References Cited

U.S. PATENT DOCUMENTS 11,390,958 B2 *  7/2022  Mitsushima ............ C25B 15/08
2016/0237578 A1 *  8/2016  Ichikawa .............. C25B 11/051

FOREIGN PATENT DOCUMENTS

JP  2015-086420  5/2015
JP  2017-190476  10/2017
(Continued)

OTHER PUBLICATIONS

International Search Report, issued in the corresponding PCT application No. PCT/JP2021/008958, dated May 11, 2021, with English translation, 5 pages.
(Continued)

*Primary Examiner* — Brian W Cohen

(74) *Attorney, Agent, or Firm* — Hamre, Schumann, Mueller & Larson, P.C.

(57) ABSTRACT

The present invention realizes industrially excellent effects such that when electric power having a large output fluctuation, such as renewable energy, is used as a power source, electrolysis performance is unlikely to be deteriorated and excellent catalytic activity is retained stably over a longer period of time, and in addition, the present invention provides a technique that enables forming a catalyst layer of an oxygen generation anode, which gives such excellent effects, with a more versatile materials and by a simple electrolysis method. Provided are an alkaline water electrolysis method including supplying an electrolyte obtained by dispersing a catalyst containing a hybrid nickel-iron hydroxide nanosheet (NiFe-ns) being a composite of a metal hydroxide and an organic substance to an anode chamber and a cathode chamber, and using the electrolyte for electrolysis in each chamber in common, an alkaline water electrolysis method including supplying an electrolyte obtained by dispersing a catalyst containing the NiFe-ns to an anode chamber and a cathode chamber, and performing electrolytic deposition of the NiFe-ns in the electrolytic cell during operation to electrolytically deposit the NiFe-ns on a surface of an electrically conductive substrate having a catalyst layer formed on a surface of an oxygen generation anode, thereby recovering and improving electrolysis performance, and an alkaline water electrolysis anode.

6 Claims, 4 Drawing Sheets

(51) Int. Cl.
  *C25B 15/029* (2021.01)
  *C25B 11/077* (2021.01)
  *C25B 15/08* (2006.01)
  *C25B 11/061* (2021.01)
  *C25B 11/085* (2021.01)
(52) U.S. Cl.
  CPC .......... *C25B 11/077* (2021.01); *C25B 11/085* (2021.01); *C25B 15/029* (2021.01); *C25B 15/08* (2013.01)

(56) References Cited

FOREIGN PATENT DOCUMENTS

| WO | 2018/127536 | 7/2018 |
| WO | 2019/172160 | 9/2019 |
| WO | 2020/184607 | 9/2020 |

OTHER PUBLICATIONS

Lu et al., "Electrochemical-Ellipsometric Studies of Oxide Film Formed on Nickel during Oxygen Evolution", J. Electrochem. Soc., vol. 125, No. 9, pp. 1416-1422, 1978.

Bowen et al., "Developments in Advanced Alkaline Water Electrolysis", Int. J. Hydrogen Energy, vol. 9, No. 1/2, pp. 59-66, 1984.

Fujita et al., "Electrocatalytic Activity and Durability of $Li_xNi_{2-x}O_2$/Ni Electrode Prepared by Oxidation with LiOH Melt for Alkaline Water Electrolysis", Electrocatalysis, vol. 8, pp. 422-429, 2017.

Kuroda et al., "Self-repairing hybrid nanosheet anode catalysts for alkaline water electrolysis connected with fluctuating renewable energy", Electrochimica Acta, vol. 323, 10 pages, Nov. 10, 2019.

Barwe et al., "Overcoming the Instability of Nanoparticle-Based Catalyst Films in Alkaline Electrolyzers by using Self-Assembling and Self-Healing Films", Angewandte. Chemie. Int. Ed., vol. 56, pp. 8573-8577, 2017.

Kuroda et al., "Direct Synthesis of Highly Designable Hybrid Metal Hydroxide Nanosheets by Using Tripodal Ligands as One-Size-Fits-All Modifiers", Chem. Eur. J., Nanostructures, vol. 23, pp. 5023-5032, 2017.

\* cited by examiner

[Figure 1]
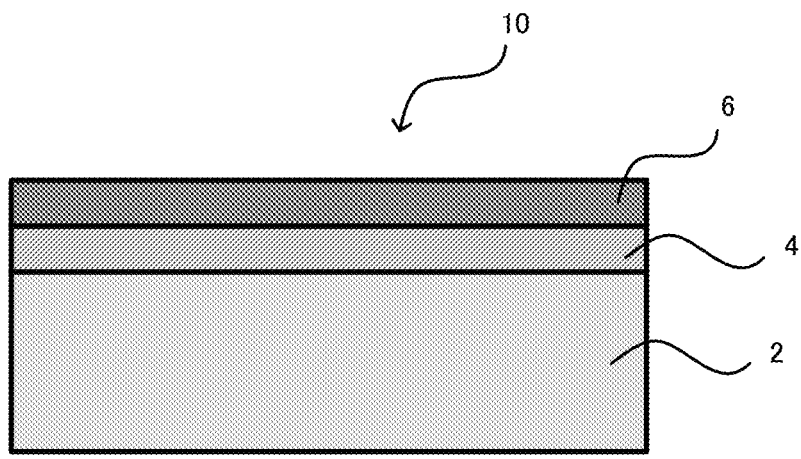
[Figure 2]
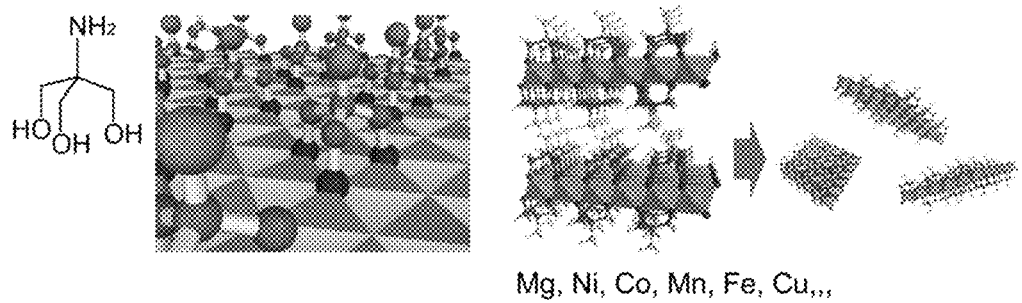
Mg, Ni, Co, Mn, Fe, Cu,,,
[Figure 3]
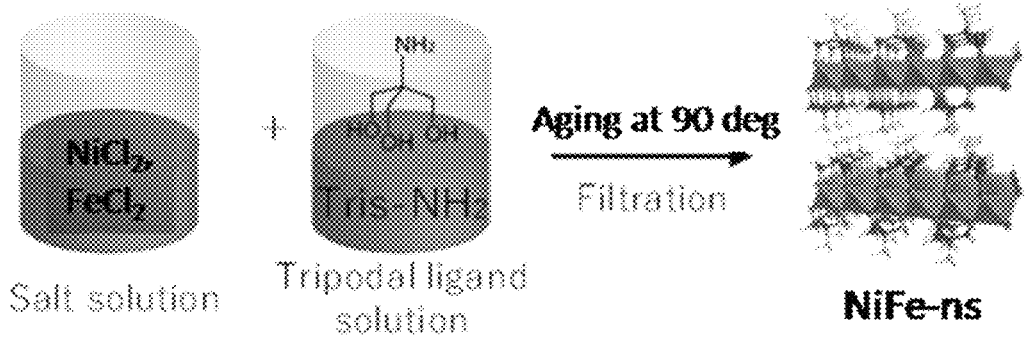

[Figure 4]
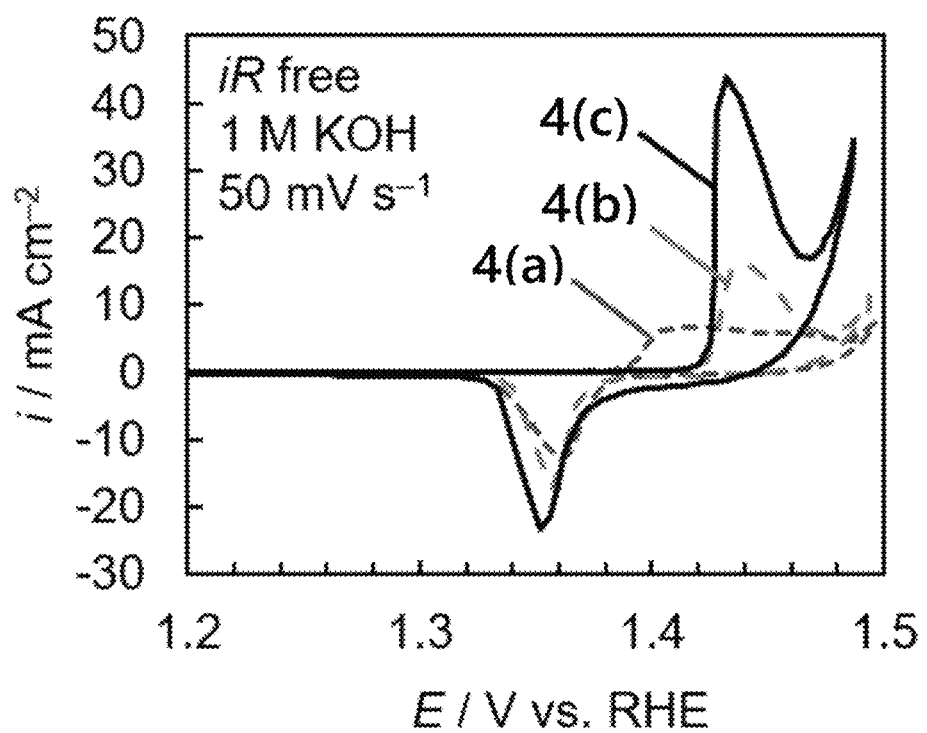

[Figure 5]
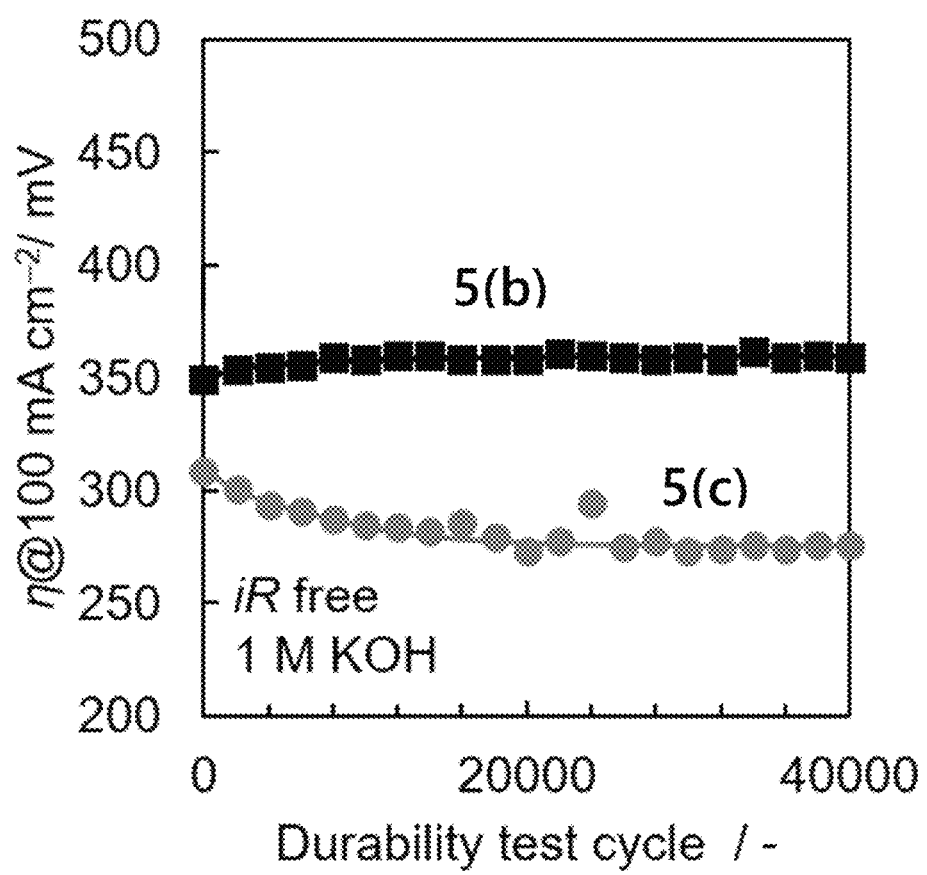

[Figure 6]
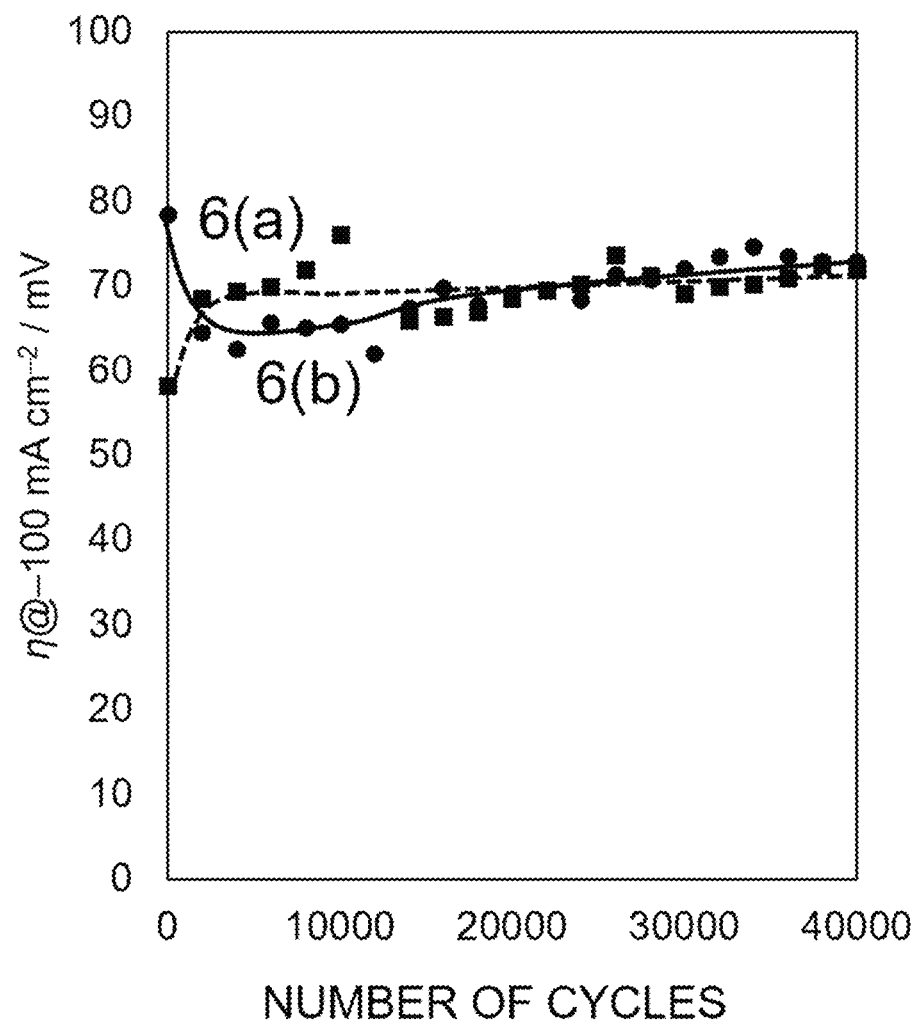

US 11,692,276 B2

ALKALINE WATER ELECTROLYSIS METHOD, AND ANODE FOR ALKALINE WATER ELECTROLYSIS

TECHNICAL FIELD

The present invention relates to an alkaline water electrolysis method and an alkaline water electrolysis anode. In more detail, the present invention provides a technique such that stable retention of the catalytic activity of an oxygen generation anode over a long period of time is realized by simple means of supplying a common electrolyte having particular constitution to an anode chamber and a cathode chamber that form an electrolytic cell, and thereby alkaline water electrolysis in which the electrolysis performance is unlikely to be deteriorated and which is stable for a long period of time can be performed even when electric power having a large output fluctuation, such as renewable energy, is used as a power source.

BACKGROUND ART

Hydrogen is secondary energy which is suitable for storage and transportation and has small environmental load, and therefore a hydrogen energy system using hydrogen as an energy carrier has been attracting attention. Currently, hydrogen is mainly produced by steam reforming of fossil fuel, or the like. However, from the viewpoint of problems of global warming and exhaustion of fossil fuel, hydrogen production by water electrolysis from renewable energy, such as solar power generation and wind power generation, has become important in generic technology. Water electrolysis is low cost, suitable for enlargement of scale, and therefore is a predominant technique for hydrogen production.

Current practical water electrolysis is largely divided into two. One is alkaline water electrolysis, in which a high-concentration alkali aqueous solution is used for an electrolyte. The other is solid polymer electrolyte water electrolysis, in which a solid polymer electrolyte membrane (SPE) is used for an electrolyte. When large-scale hydrogen production is performed by water electrolysis, it is said that alkaline water electrolysis, in which an inexpensive material, such as an iron group metal including nickel and the like, is used, is more suitable than solid polymer electrolyte water electrolysis, in which an electrode using a large amount of an expensive noble metal is used.

With respect to the high-concentration alkali aqueous solution, electric conductivity becomes high as the temperature increases, but corrosiveness also becomes high. Therefore, the upper limit of the operation temperature is controlled to about 80 to about 90° C. The electrolytic cell voltage has been improved to 2 V or less at a current density of 0.6 Acm$^{-2}$ by the development of constitutional materials and various piping materials for an electrolytic bath, which are high-temperature resistant and resistant to a high-concentration alkali aqueous solution, and the development of a low-resistivity separator and an electrode which has an enlarged surface area and has a catalyst applied thereon.

A nickel-based material which is stable in a high-concentration alkali aqueous solution is used as an alkaline water electrolysis anode, and it has been reported that in the case of alkaline water electrolysis using a stable power source, a nickel-based anode has a life of several decades or longer (Non-Patent Literatures 1 and 2). However, when renewable energy is used as a power source, severe conditions, such as sudden start/stop and abrupt load fluctuation, are frequent, and therefore deterioration in performance of the nickel-based anode has been problematic (Non-Patent Literature 3).

Both of the reaction of producing a nickel oxide and the reaction of reducing the produced nickel oxide progress on a metal surface. Therefore, elimination of an electrode catalyst formed on the metal surface is facilitated with the progress of these reactions. When the electric power for electrolysis is not supplied, the electrolysis stops, and the nickel-based anode is retained at a potential lower than the oxygen generation potential (1.23 V vs. RHE) and higher than the potential of a hydrogen generation cathode, which is a counter electrode, (0.00 V vs. RHE). In the electrolytic cell, electromotive force due to various chemical species is generated, so that the anode potential is retained low, and the reaction of reducing the nickel oxide is facilitated by the progress of a battery reaction. The RHE is the abbreviation of Reversible Hydrogen Electrode.

A current generated by the battery reaction leaks through piping that connects cells in the case of, for example, an electrolytic bath obtained by combining a plurality of cells, such as an anode chamber and a cathode chamber. Examples of the countermeasure for preventing such leakage of a current include a method of allowing a minute current to flow continuously during shutdown. However, to allow a minute current to flow continuously during shutdown, special power source control is needed, and oxygen and hydrogen are generated at all times, and therefore there is a problem that excessive labor has to be done in terms of operation management. In addition, preventing a battery reaction by removing liquid immediately after shutdown for the purpose of intentionally avoiding a reverse current state is possible, but it is difficult to say that such measure is always an adequate approach when operation with electric power having a large output fluctuation, such as renewable energy, is supposed.

In the past, platinum group metals, platinum group metal oxides, valve metal oxides, iron group oxides, lanthanide group metal oxides, and the like have been utilized as a catalyst for oxygen generation anode (anode catalyst) which is used for alkaline water electrolysis. As other anode catalysts, alloy-based anode catalysts using nickel as a base, such as Ni—Co and Ni—Fe; nickel having an enlarged surface area; spinel-based anode catalysts, such as $Co_3O_4$ and $NiCo_2O_4$; perovskite-based electrically conductive oxides (ceramic materials), such as $LaCoO_3$ and $LaNiO_3$; noble metal oxides; oxides containing a lanthanide group metal and a noble metal; and the like have also been known (Non-Patent Literature 3).

In recent years, various proposals on the oxygen generation anode which is used for high-concentration alkaline water electrolysis have been made. For example, an alkaline water electrolysis anode obtained by forming a lithium-containing nickel oxide catalyst layer containing lithium and nickel in a predetermined molar ratio on the surface of a nickel substrate (Patent Literature 1) and an alkaline water electrolysis anode obtained by forming a catalyst layer containing a nickel-cobalt-based oxide, and an iridium oxide or a ruthenium oxide on the surface of a nickel substrate (Patent Literature 2) have been proposed.

The present inventors have already proposed an oxygen generation anode the constitution of which have never been known in the past as a technique that solves the problems of the conventional techniques proposed above. Specifically, it is an oxygen generation anode provided with a catalyst layer containing a hybrid cobalt hydroxide nanosheet (Co-ns), which is a composite of a metal hydroxide and an organic substance, on a surface of an electrically conductive substrate having a surface composed of nickel or a nickel base alloy. Further, the present inventors have proposed an alkaline water electrolysis method including using this oxygen generation anode and suppling an electrolyte obtained by dispersing a hybrid cobalt hydroxide nanosheet (Co-ns), which is a component for forming the catalyst layer, to an anode chamber and a cathode chamber that form an electrolytic cell, and using the electrolyte for electrolysis in each chamber in common (Non-Patent Literature 4).

CITATION LIST

Patent Literature

Patent Literature 1: Japanese Patent Laid-Open No. 2015-86420
Patent Literature 2: Japanese Patent Laid-Open No. 2017-190476

Non-Patent Literature

Non-Patent Literature 1: P. W. T. Lu, S. Srinivasan, J. Electrochem. Soc., 125, 1416(1978)
Non-Patent Literature 2: C. T. Bowen, Int. J. Hydrogen Energy, 9, 59(1984)
Non-Patent Literature 3: S. Mitsushima et al., Electrocatalysis, 8, 422(2017)
Non-Patent Literature 4: Y. Kuroda, T. Nishimoto, S. Mitsushima, Electrochim. Acta, 323, Article 134812(2019)

SUMMARY OF INVENTION

Technical Problem

According to studies conducted by the present inventors, there has been a problem that even in the alkaline water electrolysis anodes proposed in Patent Literatures 1 and 2 described above, the performance is likely to be deteriorated, making it difficult to use the anode stably over a long period of time when electric power having a large output fluctuation, such as renewable energy, is used as a power source. To solve such a problem, enhancement of durability of an anode against potential fluctuation due to sudden start/stop and abrupt fluctuation in potential load is required.

The present invention has been completed in view of such a problem of the conventional techniques, and an object of the present invention is to provide a useful electrolysis electrode such that even when electric power having a large output fluctuation, such as renewable energy, is used as a power source, the electrolysis performance is unlikely to be deteriorated and excellent catalytic activity is retained stably over a long period of time. Further, the ultimate goal of the present invention is to provide an operation method such that even when electric power having a large output fluctuation, such as renewable energy, is used as a power source, alkaline water electrolysis in which the electrolysis performance is unlikely to be deteriorated and which is stable over a long period of time can be performed by using the excellent electrolysis electrode.

According to the previously mentioned oxygen generation anode provided with a catalyst layer containing a hybrid cobalt hydroxide nanosheet (Co-ns), which is a composite of a metal hydroxide and an organic substance, and novel alkaline water electrolysis method using the anode, both of which have been proposed by the present inventors, effects are obtained such that even when electric power having a large output fluctuation, such as renewable energy, is used, the electrolysis performance is unlikely to be deteriorated and the catalytic activity is maintained over a long period of time.

An object of the present invention is to propose a technique that can be industrially utilized more effectively by allowing these techniques developed by the present inventors to progress further. Specifically, the object of the present invention is to realize more excellent effects such that even when electric power having a large output fluctuation, such as renewable energy, is used, the electrolysis performance is more unlikely to be deteriorated and the excellent catalytic activity is retained stably over a longer period of time as compared to the case where the Co-ns is utilized. In addition, another object of the present invention is to develop an industrially useful technique by which the catalyst layer of the oxygen generation anode that gives such excellent effects can be formed with more versatile materials and by a simple electrolysis method.

Solution to Problem

The objects are achieved by the present invention described below. That is, the present invention provides the following alkaline water electrolysis method.
[1] An alkaline water electrolysis method including supplying an electrolyte obtained by dispersing a catalyst containing a hybrid nickel-iron hydroxide nanosheet (hereinafter, sometimes abbreviated as NiFe-ns) being a composite of a metal hydroxide and an organic substance to an anode chamber and a cathode chamber that form an electrolytic cell, and using the electrolyte for electrolysis in each chamber in common.
[2] An alkaline water electrolysis method including: supplying an electrolyte obtained by dispersing a catalyst comprising a hybrid nickel-iron hydroxide nanosheet (NiFe-ns) being a composite of a metal hydroxide and an organic substance to an anode chamber and a cathode chamber that form an electrolytic cell, and using the electrolyte for electrolysis in each chamber in common; and performing electrolytic deposition of the NiFe-ns in the electrolytic cell during operation to electrolytically deposit the NiFe-ns on a surface of an electrically conductive substrate that forms an oxygen generation anode and has the catalyst layer formed on a surface thereof, thereby recovering and improving electrolysis performance.

Preferred embodiments of the alkaline water electrolysis method include the followings.
[3] The alkaline water electrolysis method according to [1] or [2], wherein the NiFe-ns has a layered molecular structure having a size of 10 to 100 nm.
[4] The alkaline water electrolysis method according to [2] or [3], wherein a condition of electrolytically depositing the NiFe-ns on the surface of the electrically conductive substrate is to retain the electrically conductive substrate in a potential range of 1.2 V to 1.8 V vs. RHE.
[5] The alkaline water electrolysis method according to any one of [1] to [4], wherein an electrolyte prepared using the NiFe-ns dispersion liquid having a concentration of 10 to 100 g/L in such a way that a concentration of the NiFe-ns dispersion liquid added to the electrolyte falls within a range of 0.1 to 5 mL/L is used as the electrolyte obtained by dispersing the NiFe-ns.

Further, the present invention provides as another embodiment the following alkaline water electrolysis anode that is useful when applied to the alkaline water electrolysis method.

[6] An alkaline water electrolysis anode that performs oxygen generation, the alkaline water electrolysis anode provided with: an electrically conductive substrate having a surface containing nickel or a nickel base alloy; an intermediate layer formed on the surface of the electrically conductive substrate, the intermediate layer containing a lithium-containing nickel oxide represented by compositional formula $Li_xNi_{2-x}O_2$ wherein $0.02 \leq x \leq 0.5$; and a catalyst layer formed on a surface of the intermediate layer, the catalyst layer containing a hybrid nickel-iron hydroxide nanosheet (NiFe-ns) being a composite of a metal hydroxide and an organic substance.

Advantageous Effects of Invention

The present invention enables providing an alkaline water electrolysis anode (in the present specification, also referred to as oxygen generation anode) that performs oxygen generation, the alkaline water electrolysis anode being such that even when electric power having a large output fluctuation, such as renewable energy, is used as a power source, the electrolysis performance is unlikely to be deteriorated during electrolysis operation, and excellent catalytic activity is retained more stably over a long period of time. Further, the present invention can realize stable retention of the catalytic activity of the oxygen generation anode over a long period of time by simple means of supplying a common electrolyte to an anode chamber and a cathode chamber. Particularly when electric power having a large output fluctuation, such as renewable energy, is used as a power source, the present invention can provide an industrially useful alkaline water electrolysis method by which alkaline water electrolysis in which the electrolysis performance is unlikely to be deteriorated and which is more stable over a long period of time can be performed. Further, materials for forming a catalyst layer of the industrially useful alkaline water electrolysis anode that is utilized in the present invention and gives the above-described excellent effects are extremely versatile materials, and the catalyst layer can be formed simply and quickly by constant current electrolysis, and therefore the technique of the present invention is excellent in industrial utility and the practical value of the technique of the present invention is extremely high.

BRIEF DESCRIPTION OF DRAWINGS

FIG. 1 is a section view schematically showing one embodiment of an oxygen generation anode that is used in an alkaline water electrolysis method of the present invention.

FIG. 2 is a diagram showing one example of a layered molecular structure of NiFe-Tris-$NH_2$ having a tripodal ligand, the NiFe-Tris-$NH_2$ being a catalyst component that is used in the present invention.

FIG. 3 is a diagram showing a production method example, a composition, and a structural formula of a catalyst layer having a layered structure on a surface of an electrically conductive substrate of an oxygen generation anode that is used in the present invention.

FIG. 4 is a graph showing a change in current-potential (change in catalytic activity) of a sample in potential cycles in Examination Example 1.

FIG. 5 is a graph showing a change in an electrolytic property in Examination Example 1 and Comparative Examination Examples 1.

FIG. 6 is a graph showing a change in an electrolytic property in Examination Example 2 and Comparative Examination Example 2.

DESCRIPTION OF EMBODIMENTS

Hereinafter, the present invention will be described in detail giving preferred embodiments. Under the circumstances of the previously mentioned conventional techniques, there are proposals on the technique given below. For example, in recent years, a technique on a stable catalyst layer having self-recovering ability based on self-assembly of the catalyst particles on the spot during electrolysis operation has been proposed in E. Ventosa et al., Angew. Chem. Int. Ed. 2017, 56, 8573. In this conventional technique, the catalyst particles are added to an electrolyte to form a suspension, and particles having a negatively charged surface adhere to an anode, and on the other hand, particles having a positively charged surface adhere to a cathode. And those described below have been disclosed. The catalyst particles have self-recovering properties as long as sufficient catalyst particles are present in the electrolyte. In an example where NiFe-LDH (NiFe-layered double hydroxide) and a nano-powder of a NixB catalyst are used for the anode and the cathode respectively, the cell voltage is lowered only when NixB is added to the catholyte. A film of dense particles is observed on the cathode, but film formation is not observed on the anode. Only the effect of NixB as a cathode catalyst has been ascertained, and there is not any effect on the anode.

Further, Non-Patent Literature 4 described previously has first reported that in an electrolyte obtained by dispersing a self-recovering catalyst Co-ns for an anode, the performance of the anode is improved, but on the other hand, the electrolyte gives little influence on a cathode electrode. However, there is still room for improvements in the anode performance, and the effect has not been sufficient.

The present inventors have conducted diligent studies in order to solve the problem. As a result, the present inventors have found that a hybrid nickel-iron hydroxide nanosheet (NiFe-ns) obtained based on a novel production method recently disclosed in Y. Kuroda et al., Chem. Eur. J. 2017, 23, 5032 can function more effectively as an exceptionally durable, self-organized electrode catalyst, and by using this sheet, the above-described problem in the conventional technique can be solved at a higher level, and thereby completed the present invention. Specifically, the present inventors have found that when the hybrid nickel-iron hydroxide nanosheet (NiFe-ns) being a composite of a metal hydroxide and an organic substance is used by dispersing it in an electrolyte and utilized as a self-organized electrode catalyst, thereby the NiFe-ns acts as a catalyst and an anticorrosion film and can improve the durability of a Ni-based anode against potential fluctuation more significantly than an anode utilizing the previously proposed Co-ns. Further, the NiFe-ns does not affect an active cathode particularly and can be applied to an electrolytic cell, and therefore the present invent inventors have also found that an electrolyte obtained by dispersing the nano sheet can be supplied to both of an anode chamber and a cathode chamber that form an electrolytic cell and can be used for electrolysis in each chamber in common.

[Anode]

FIG. 1 is a section view schematically showing one embodiment of an alkaline water electrolysis anode 10 that is used in the alkaline water electrolysis method of the present invention and performs oxygen generation. As shown in FIG. 1, the oxygen generation anode of the present embodiment is provided with an electrically conductive substrate 2, an intermediate layer 4 formed on the surface of the electrically conductive substrate 2, and a catalyst layer 6 formed on the surface of the intermediate layer 4. Hereinafter, the details on the oxygen generation anode that is used in the alkaline water electrolysis method of the present invention will be described with reference to the drawings.

<Electrically Conductive Substrate>

The electrically conductive substrate 2 is an electric conductor that conducts electricity for electrolysis and is an element having a function as a carrier that carries the intermediate layer 4 and the catalyst layer 6. At least a surface of the electrically conductive substrate 2 (the surface on which the intermediate layer 4 is formed) is formed with nickel or a nickel base alloy. That is, the whole of the electrically conductive substrate 2 may be formed with nickel or a nickel base alloy, or only the surface of the electrically conductive substrate 2 may be formed with nickel or a nickel base alloy. Specifically, the electrically conductive substrate 2 may be, for example, such that a coating of nickel or a nickel base alloy is applied on the surface of a metal material, such as iron, stainless steel, aluminum, or titanium, by plating or the like.

The thickness of the electrically conductive substrate 2 is preferably 0.05 to 5 mm. In addition, the shape of the electrically conductive substrate is preferably a shape having an opening for removing bubbles of oxygen, hydrogen, and the like to be generated by electrolysis. For example, an expanded mesh or a porous expanded mesh can be used as the electrically conductive substrate 2. When the electrically conductive substrate has a shape having an opening, the aperture ratio of the electrically conductive substrate is preferably 10 to 95%.

The oxygen generation anode that is used in the alkaline water electrolysis method of the present invention can be obtained by, for example, forming the intermediate layer 4 and the catalyst layer 6 on the surface of the above-described electrically conductive substrate 2 as follows.

(Pre-Treatment Step)

The electrically conductive substrate 2 is preferably subjected to a chemical etching treatment in advance for the purpose of removing contamination particles of a metal, an organic substance, and the like on the surface before performing steps of forming the intermediate layer 4 and the catalyst layer 6. The consumption of the electrically conductive substrate 2 by the chemical etching treatment is preferably set to about 30 g/m$^2$ or more and about 400 g/m$^2$ or less. In addition, the surface of the electrically conductive substrate 2 is preferably subjected to a roughening treatment in advance for the purpose of enhancing the adhesiveness with the intermediate layer. Examples of the means for the roughening treatment include a blast treatment in which a powder is sprayed, an etching treatment using an acid that can dissolve the substrate, and plasma spraying.

<Intermediate Layer>

The intermediate layer 4 is a layer formed on the surface of the electrically conductive substrate 2. The intermediate layer 4 suppresses corrosion or the like of the electrically conductive substrate 2 and fixes the catalyst layer 6 stably to the electrically conductive substrate 2. In addition, the intermediate layer 4 also serves as a function of supplying a current quickly to the catalyst layer 6. The intermediate layer 4 may be formed with, for example, a lithium-containing nickel oxide represented by composition formula $Li_xNi_{2-x}O_2$ ($0.02 \leq x \leq 0.5$). When x in the compositional formula is less than 0.02, the electric conductivity is insufficient. On the other hand, when x exceeds 0.5, the physical strength and the chemical stability are lowered. The intermediate layer 4 formed with a lithium-containing nickel oxide represented by the compositional formula has enough electric conductivity for electrolysis, and exhibits excellent physical strength and chemical stability even after the use for a long period of time.

The thickness of the intermediate layer 4 is preferably 0.01 µm or more and 100 µm or less, and more preferably 0.1 µm or more and 10 µm or less. When the thickness of the intermediate layer is less than 0.01 µm, the above-mentioned functions are not obtained sufficiently. On the other hand, even if the thickness of the intermediate layer is set in such a way as to exceed 100 µm, the above-mentioned functions are not exhibited sufficiently because the voltage loss due to the resistance in the intermediate layer is large, and it is somewhat disadvantageous in terms of production costs or the like in some cases.

(Application Step for Forming Intermediate Layer 4)

In the application step, an aqueous solution of a precursor containing a lithium ion and a nickel ion is applied on the surface of the electrically conductive substrate 2. The intermediate layer 4 is formed by a so-called thermal decomposition method. When the intermediate layer is formed by the thermal decomposition method in this manner, an aqueous solution of a precursor of the intermediate layer is first prepared, and this aqueous solution is used. To prepare the aqueous solution of the precursor containing a lithium component, a known precursor, such as lithium nitrate, lithium carbonate, lithium chloride, lithium hydroxide, and a lithium carboxylate, can be used. Examples of the lithium carboxylate include lithium formate and lithium acetate. To prepare the aqueous solution of the precursor containing a nickel component, a known precursor, such as nickel nitrate, nickel carbonate, nickel chloride, and a nickel carboxylate, can be used. Examples of the nickel carboxylate include nickel formate and nickel acetate. It is particularly preferable to use at least one of a lithium carboxylate and a nickel carboxylate in particular as the precursor because thereby a dense intermediate layer can be formed even when calcination is performed at a low temperature, as will be mentioned later.

The thermal treatment temperature at the time when the intermediate layer 4 is formed using an aqueous solution of a precursor such as one described above by the thermal decomposition method can appropriately be set. When the decomposition temperature of the precursor and the production costs are taken into consideration, the thermal treatment temperature is preferably set to 450° C. or higher and 600° C. or lower. The thermal treatment temperature is more preferably set to 450° C. or higher and 550° C. or lower. For example, the decomposition temperature of lithium nitrate is about 430° C., and the decomposition temperature of nickel nitrate is about 373° C. When the thermal treatment temperature is set to 450° C. or higher, thereby each component can more surely be decomposed. When the thermal treatment temperature is set in such a way as to exceed 600° C., the oxidation of the electrically conductive substrate 2 easily progresses, and the electrode resistance increases to bring about an increase in the voltage loss in some cases. The thermal treatment temperature may appropriately be set taking the reaction rate, the productivity, the oxidation resistance at the surface of the catalyst layer, and the like into consideration.

By appropriately setting the number of times of application of the aqueous solution of the precursor in the previously mentioned application step, the thickness of the intermediate layer 4 to be formed can be controlled. Note that the application and drying of the aqueous solution of the precursor may be repeated for every layer to form the uppermost layer, and the thermal treatment may thereafter be performed on the whole layers. In addition, the application of the aqueous solution and the thermal treatment (pre-treatment) may be repeated for every layer to form the uppermost layer, and the thermal treatment may thereafter be performed on the whole layers. The temperature of the pre-treatment and the temperature of the thermal treatment on the whole layer in this case may be the same or different. The time for the pre-treatment is preferably made shorter than the time for the thermal treatment on the whole layers.

<Catalyst Layer>

The embodiment of the oxygen generation anode that is used in the alkaline water electrolysis method of the present invention is preferably made such that the catalyst layer 6 containing a particular catalyst component is formed on the outermost surface of the electrically conductive substrate 2. By constituting the catalyst layer 6 in this way and applying the catalyst layer 6 to alkaline water electrolysis, more excellent effects of the present invention can be exhibited. Hereinafter, the constitution of the catalyst layer 6 that is effective and useful in the present invention will be described.

(Catalyst Component)

The hybrid nickel-iron hydroxide nanosheet (NiFe-ns) that is used in the present invention, that is a catalyst component that characterizes the present invention, and that is a composite of a metal hydroxide and an organic substance can simply be produced by, for example, in the manner as described below. In order to synthesize the NiFe-ns, an aqueous solution of a tripodal ligand tris(hydroxymethyl)aminomethane (Tris-$NH_2$), an aqueous solution of $NiCl_2$ and an aqueous solution of $FeCl_2$ are mixed, and a resultant mixture is reacted at 90° C. for 24 hours. Then, the reaction product is separated as gel through filtration and washing with pure water and is then subjected to an ultrasonic treatment in pure water to obtain a NiFe-ns dispersion liquid. The NiFe-ns concentration in the dispersion liquid is set to 10 mg/mL. Hereinafter, this refers to the "NiFe-ns dispersion liquid." As an electrolyte which is used below and in which the NiFe-ns is dispersed, an electrolyte prepared by adding the "NiFe-ns dispersion liquid," obtained by the above-described production method, in such a way that the added concentration is appropriate is used.

As schematically shown in FIG. 2, the NiFe-ns has a layered molecular structure of NiFe-ns-Tris-$NH_2$ having a tripodal ligand and contains a brucite layer to which Tris molecules are covalently fixed. Modification with Tris-$NH_2$ enhances the peelability and dispersibility of the layered nickel-iron hydroxide in an electrolyte. It has been ascertained from a TEM image and an AFM image that the molecular structure of the NiFe-ns obtained above is in the form of a nanosheet having a thickness of about 1.3 nm and a size in the transverse direction within a range of 10 to 100 nm. In addition, it has been ascertained from XRD that the NiFe-ns has a layered structure in which the intervals between the bottom surfaces are enlarged. The Ni/Fe ratio of the NiFe-ns obtained above is 1.45. The Ni/Fe ratio which is used in the present invention may be, for example, 1/10 to 10/1. The nanosheet, when used in the alkaline water electrolysis method of the present invention, preferably has a size of length (major diameter) in a range of 10 to 100 nm. According to studies conducted by the present inventors, it is not preferable that the length is equal to or longer than this because the efficiency of electrolytic deposition is lowered to make it difficult to exhibit effects of an improvement in and recovery of overpotential in some cases.

According to studies conducted by the present inventors, by using the hybrid nickel-iron nanosheet (NiFe-ns) as the catalyst component that characterizes the present invention, that forms the catalyst layer of an anode, and that utilizes by being contained in an electrolyte, more excellent effects are obtained as compared to the technique of utilizing the hybrid cobalt hydroxide nanosheet (Co-ns), which the present inventors have previously proposed. Specifically, the potential fluctuation cycle dependency of the oxygen generation overpotential has been examined by forming a catalyst layer of an anode utilizing each of the above-described nanosheets, using the anode, suppling an electrolyte in which each of the above-described different nanosheets is contained to an anode chamber and a cathode chamber that form an electrolytic cell, and conducting the accelerated deterioration test of the electrolysis performance. As a result, it has been ascertained that a remarkable decreasing tendency from the initial overpotential is clearly seen and the durability is superior in the case where the NiFe-ns is used as compared to the case where the Co-ns is used as the catalyst component. The details will be mentioned later. Further, the NiFe-ns that is used as the catalyst component is obtained from extremely versatile materials and therefore has an advantageous point of being easy to utilize industrially.

(Method for Forming Catalyst Layer)

Hereinafter, the method for forming the catalyst layer 6 containing the NiFe-ns will be mentioned. A 1.0 M KOH aqueous solution is used as an electrolyte. It is preferable to perform potential manipulation in the electrolyte for the purpose of cleaning the surface of the electrically conductive substrate 2 on which the catalyst layer is formed. For example, cyclic manipulation of potential (−0.5 to 0.5 V vs. RHE, 200 mV/s, 200 cycles) is performed. Thereafter, a 1.0 M KOH aqueous solution containing 1 mL/L, as the added amount, of the "NiFe-ns dispersion liquid" obtained as previously mentioned is prepared, and this 1.0M KOH aqueous solution is used as the electrolyte. Constant current electrolysis at 800 mA/cm$^2$ for 30 minutes is performed 8 times using the electrolyte in order to deposit the NiFe-ns on the surface of the Ni substrate. By this electrolysis operation, the dispersibility of the NiFe-ns on the surface of an electrode is lowered through oxidation of a hydroxide layer or oxidative decomposition of surface organic groups, so that the NiFe-ns is deposited on the surface of the electrode.

In the above-described test, it has been ascertained that the concentration of the "NiFe-ns dispersion liquid" to be added to the electrolyte is preferably in a range of 0.1 to 5 mL/L. According to studies conducted by the present inventors, it is not preferable that the concentration is higher than this because dispersion of the NiFe-ns in the electrolyte is insufficient and uniform deposition is not obtained in the electrolysis in some cases. In addition, when the concentration is lower than this, a sufficient amount of deposition is not obtained within a practical time in the deposition by the electrolysis. Further, as an electrolysis condition for the deposition, it is preferable to retain the electrically conductive substrate in a potential range of 1.2 V to 1.8 V vs. RHE. The deposition reaction does not progress at 1.2 V or lower, and it is not preferable that the potential is 1.8 V or higher, oxygen generation progresses simultaneously to inhibit the deposition.

In the alkaline water electrolysis method of the present invention, the electrode of the constitution having a particular catalyst layer described above needs to be used as the oxygen generation anode. On the other hand, the cathode and the separator are not particularly limited, and those which have been used in conventional alkaline water electrolysis may appropriately be used. Hereinafter, these will be described.

[Cathode]

As the cathode, a substrate made of a material that is bearable to alkaline water electrolysis and a catalyst having a small cathode overpotential are preferably selected and used. As the cathode substrate, a nickel substrate, or a cathode substrate obtained by forming an active cathode by coating the nickel substrate can be used. Examples of the shape of the cathode substrate include an expanded mesh and a porous expanded mesh in addition to a plate shape.

The cathode material includes porous nickel having a large surface area, a Ni—Mo-based material, and the like. Besides, the cathode material includes Raney nickel-based materials, such as Ni—Al, Ni—Zn, and Ni—Co—Zn; sulfide-based materials, such as Ni—S; and hydrogen absorbing alloy-based materials, such as $Ti_2Ni$; and the like. The catalyst preferably has characteristics of low hydrogen overpotential, high stability against short-circuit, high poisoning resistance, and the like. As other catalysts, metals, such as platinum, palladium, ruthenium, and iridium, and oxides thereof are preferable.

[Separator]

As the electrolysis separator, any of conventionally known electrolysis separators, such as asbestos, non-woven fabric, an ion-exchange membrane, a porous polymer membrane, and a composite membrane of an inorganic substance and an organic polymer can be used. Specifically, an ion-permeable separator such that organic fiber cloth is incorporated in a mixture of a hydrophilic inorganic material, such as a calcium phosphate compound and calcium fluoride, and an organic binding material, such as polysulfone, polypropylene, and polyvinylidene fluoride, can be used. In addition, an ion-permeable separator such that stretched organic fiber cloth is incorporated in a film-forming mixture of an inorganic hydrophilic material in the form of particles, such as oxides and hydroxides of antimony and zirconium, and an organic binder, such as a fluorocarbon polymer, polysulfone, polypropylene, polyvinyl chloride, and polyvinyl butyral, and the like can be used.

In the alkaline water electrolysis method of the present invention, a high-concentration alkali aqueous solution can be electrolyzed by using an alkaline water electrolytic cell using the oxygen generation anode that characterizes the present invention as a constitutional element. The alkali aqueous solution that is used as the electrolyte is preferably an aqueous solution of an alkaline metal hydroxide, such as potassium hydroxide (KOH) or sodium hydroxide (NaOH). The concentration of the alkali aqueous solution is preferably 1.5% by mass or more and 40% by mass or less. In addition, the concentration of the alkali aqueous solution is preferably 15% by mass or more and 40% by mass or less because the electrical conductivity is large, and the electric power consumption can be suppressed. Further, when the cost, the corrosiveness, the viscosity, the operability, and the like are taken into consideration, the concentration of the alkali aqueous solution is preferably 20% by mass or more and 30% by mass or less.

[Operation Method]

The catalyst layer 6 of the anode can be formed before the anode is incorporated in the electrolytic cell. In the alkaline water electrolysis method of the present invention, the catalyst component is deposited on the anode by suspending the previously described nanosheet (NiFe-ns) that is used as a component for forming the catalyst layer 6 that characterizes the present invention in the common electrolyte to be supplied to the anode chamber and the cathode chamber that form the electrolytic cell, and, in such a state, starting electrolysis. Therefore, when the technique of the alkaline water electrolysis of the present invention is used, the recovery of the performance of the electrolytic cell lowered by operation can be performed without taking the time and labor for disassembling the electrolytic cell, and therefore the operation method is practical, and the industrial merit is extremely great.

EXAMPLES

Next, the present invention will be described more specifically giving Examples, Examination Examples, and Comparative Examples.

Firstly, the state of deposition on the surface of an electrode and the effect of the deposition were examined in the case where the NiFe-ns that is a catalyst component that characterizes the present invention was dispersed in an electrolyte to perform electrolysis. For comparison, the same tests were conducted also in the case where the CO-ns was used as the catalyst component.

Examination Example 1

The electrolysis operation was performed using a three-electrode cell made of PFA that is a fluororesin. The electrolysis was performed at 30±1° C. using a Ni wire etched with boiling hydrochloric acid for 6 minutes as a working electrode, a reversible hydrogen electrode (RHE) as a reference electrode, a Ni coil as a counter electrode, and 250 mL of a 1.0 M KOH aqueous solution as an electrolyte, respectively. Firstly, cyclic voltammetry (0.5 to 1.5 V vs. RHE, 200 mV/s, 200 cycles) was performed as a pre-treatment without adding the NiFe-ns dispersion liquid to the electrolyte. Next, in the present example, a mixture obtained by mixing a NiFe-ns dispersion liquid of a concentration of 50 g/L, which was obtained by the same method as described previously, and the electrolyte, which was used for the pre-treatment, in such a way that the added concentration of the NiFe-ns dispersion liquid was a ratio of 0.8 mL/L was used as an electrolyte. Then, constant current electrolysis at 800 mA/cm$^2$ for 30 minutes was performed. Thereby, the NiFe-ns was oxidized on the surface of the electrode to decrease the dispersibility by the oxidation in the layer of the hydroxide of NiFe-ns and the oxidative decomposition of surface organic groups and deposit the NiFe-ns on the surface of the electrode, and thus a catalyst layer was formed. This anode is denoted as "Ni—NiFe-ns."

Cyclic voltammetry of 0.5 to 1.7 V vs. RHE, 500 mV/s, and 200 cycles was performed as an accelerated test for potential fluctuation, and cyclic voltammetry of 0.5 to 1.8 V vs. RHE, 5 mV/s, and 2 cycles and cyclic voltammetry of 0.5 to 1.5 V vs. RHE, 50 mV/s, and 2 cycles were performed as electrode performance measurement, and these operations were repeated 20 times. FIG. 4 shows cyclic voltammetry obtained at 500 mV/s, wherein 4(a) shows: the first cycle, 4(b) shows: 2000 cycles, and FIG. 4(c) shows: 40000 cycles. As shown in FIG. 4, an anode peak (1.41 V) and a cathode peak (1.37 V), which are attributable to $Ni^{2+}/Ni^{3+}$ in a NiFe layered double hydroxide, were observed.

FIG. 5 shows potential fluctuation cycle dependency of the oxygen generation overpotential for the anode Ni—NiFe-ns, wherein the potential fluctuation cycle dependency was obtained by the above-described accelerated durability test for potential fluctuation. As a result, as shown by 5(c) in FIG. 5, when the Ni—NiFe-ns was used, the initial overpotential was 309 mV, and the overpotential decreased further to be 276 mV after 40000 cycles in the durability test. In addition, as shown by 4(b) and 4(c) in FIG. 4, the $Ni^{2+}/Ni^{3+}$ peak of the NiFe layered double hydroxide had shifted to 1.43 V after the durability test of 2000 cycles, and this indicates a structural change with the potential fluctuation. The quantity of electric charge of this peak had tendency to increase even during the durability test, and it is considered that the activity was improved by the structural change of the catalyst and the increase in the deposition amount. From the above test results, it was ascertained that the Ni—NiFe-ns has self-recovering ability under a fluctuating power source and shows high activity.

Comparative Examination Example 1

An anode in which a catalyst layer composed of the Co-ns instead of the NiFe-ns was formed in the Ni surface was obtained by the same method as performed in Examination Example 1. Then, potential fluctuation cycle dependency of the oxygen generation overpotential at the time when the accelerated deterioration test was performed was examined in the same manner as Examination Example 1 using an electrolytic solution to which the NiFe-ns was not added. As a result, as shown by 5(b) in FIG. 5, the initial overpotential was about 350 mV, thereafter the overpotential increased to 360 mV, and a remarkable decreasing tendency, shown by 5(c) in FIG. 5, which was obtained in Examination Example 1 using the anode Ni—NiFe-ns was not observed. This result indicates that the durability is more excellent in the case where the anode Ni—NiFe-ns which was tested in Examination Example 1 was used.

Example 1

A nickel expanded mesh (10 cm×10 cm, LW×3.7 SW×0.9 ST×0.8 T) on which a chemical etching treatment was performed by immersing the nickel expanded mesh in 17.5% by mass hydrochloric acid at near the boiling point for 6 minutes was used an anode substrate. This expanded mesh was subjected to a blast treatment (0.3 MPa) with alumina particles of 60 mesh, and was then immersed in 20% by mass hydrochloric acid to perform a chemical etching treatment at near the boiling point for 6 minutes. An aqueous solution containing a component to be a precursor of a lithium-containing nickel oxide was applied, with a brush, on the surface of the anode substrate after the chemical etching treatment, and was then dried at 80° C. for 15 minutes. Subsequently, the anode substrate was subjected to a thermal treatment under the atmosphere at 600° C. for 15 minutes. The above-described treatments from the application of the aqueous solution to the thermal treatment were repeated 20 times to obtain an intermediate product having an intermediate layer (composition: $Li_{0.5}Ni_{1.5}O_2$) formed on the surface of the anode substrate.

Next, an electrolyte was prepared in the same manner as described previously in Examination Example 1 using the same NiFe-ns dispersion liquid, wherein in the electrolyte, the dispersion liquid was added in such a way that the added concentration was 1 mL/L. Then, a small-sized zero-gap type electrolytic cell using a neutral separator was prepared using the electrolyte and using: a Ni anode (oxygen generation anode) having a catalyst layer composed of the NiFe-ns on the surface of the above-described intermediate product; a separator (Zirfon manufactured by AGFA-Gevaert NV); and an active cathode having a catalyst layer composed of Ru and Pr oxide and formed thereon. The area of the electrodes was set to 19 $cm^2$.

A 25% by mass KOH aqueous solution in which the NiFe-ns dispersion liquid, which is the same as the one described above, was added in a ratio such that the added concentration was 1 mL/L was used as the electrolyte. Then, the electrolyte was supplied to each of the anode chamber and the cathode chamber that form the electrolytic cell to perform electrolysis in each chamber at a current density of 6 $kA/m^2$ for 6 hours in each chamber. Subsequently, the anode and the cathode were brought into a short-circuit state (0 $kA/m^2$) to suspend the electrolysis for 15 hours. Shutdown tests in which the operation from the electrolysis to the shutdown was defined as 1 cycle were conducted. As a result, it was able to be ascertained that the voltage was kept stable in the shutdown tests of 20 times.

Comparative Example 1

As the electrolyte to be supplied to each of the anode chamber and the cathode chamber that form an electrolytic cell, the same one as used in Example 1 was used, except that the NiFe-ns was not added. Then, shutdown tests the same as the test conducted in Example 1 were conducted with the electrolytic cell which is the same one as used in Example 1. As a result, the cell voltage gradually increased as the number of times of shutdown increased. From this result, the superiority in the constitution in Example 1 using the electrolyte in which the NiFe-ns was added was ascertained.

Examination Example 2

Accelerated tests for potential fluctuation were conducted in the same manner as in Examination Example 1 except that an active cathode on which a catalyst layer composed of Ru and Pr oxide was formed was used as a counter electrode, thereby a change in potential of the cathode was measured. As shown by 6(a) in FIG. 6, the overpotential was kept in about 60 mV to about 80 mV from the beginning.

Comparative Examination Example 2

Accelerated tests for potential fluctuation were conducted in the same manner as in Examination Example 2 except that an electrolyte in which the NiFe-ns was not added was used. As shown by 6(b) as a solid line in FIG. 6, the overpotential was kept in about 60 mV to about 80 mV from the beginning. From the comparison with Examination Example 2 shown by 6(a) as a broken line in FIG. 6, it was ascertained that there was no influence on the cathode by the addition of the NiFe-ns.

INDUSTRIAL APPLICABILITY

The oxygen generation anode that characterizes the present invention is excellent in durability and is suitable as, for example, an alkaline water electrolysis anode that forms electrolysis equipment or the like using electric power having a large output fluctuation, such as renewable energy, as a power source. Specifically, by constituting an electrolytic cell as described in the present invention and supplying a common electrolyte, in which a hybrid nickel-iron hydroxide nanosheet (NiFe-ns) being a catalyst component of the anode is dispersed, to an anode chamber and a cathode chamber that form an electrolytic cell to perform electrolysis, performing alkaline water electrolysis in which the electrolysis performance is unlikely to be deteriorated and which is stable over a long period of time can be realized even when electric power having a large output fluctuation, such as renewable energy, is used as a power source.

REFERENCE SIGNS LIST

2 Electrically conductive substrate
4 Intermediate layer
6 Catalyst layer
10 Alkaline water electrolysis anode

The invention claimed is:

1. An alkaline water electrolysis method comprising supplying an electrolyte obtained by dispersing a catalyst comprising a hybrid nickel-iron hydroxide nanosheet (NiFe-ns) being a composite of a metal hydroxide and an organic substance to an anode chamber and a cathode chamber that form an electrolytic cell, and using the electrolyte for electrolysis in each chamber in common.

2. An alkaline water electrolysis method comprising:
supplying an electrolyte obtained by dispersing a catalyst comprising a hybrid nickel-iron hydroxide nanosheet (NiFe-ns) being a composite of a metal hydroxide and an organic substance to an anode chamber and a cathode chamber that form an electrolytic cell, and using the electrolyte for electrolysis in each chamber in common; and
performing electrolytic deposition of the NiFe-ns in the electrolytic cell during operation to electrolytically deposit the NiFe-ns on a surface of an electrically conductive substrate that forms an oxygen generation anode and has a catalyst layer formed on a surface thereof, thereby recovering and improving electrolysis performance.

3. The alkaline water electrolysis method according to claim 1, wherein the NiFe-ns has a layered molecular structure having a size of 10 to 100 nm.

4. The alkaline water electrolysis method according to claim 2, wherein a condition of electrolytically depositing the NiFe-ns on the surface of the electrically conductive substrate is to retain the electrically conductive substrate in a potential range of 1.2 V to 1.8 V vs. RHE.

5. The alkaline water electrolysis method according to claim 1, wherein an electrolyte prepared using the NiFe-ns dispersion liquid having a concentration of 10 to 100 g/L in such a way that a concentration of the NiFe-ns dispersion liquid added to the electrolyte falls within a range of 0.1 to 5 mL/L is used as the electrolyte obtained by dispersing the NiFe-ns.

6. An alkaline water electrolysis anode that performs oxygen generation, the alkaline water electrolysis anode comprising:
an electrically conductive substrate having a surface comprising nickel or a nickel base alloy;
an intermediate layer formed on the surface of the electrically conductive substrate, the intermediate layer comprising a lithium-containing nickel oxide represented by compositional formula $Li_xNi_{2-x}O_2$ wherein $0.02 \le x \le 0.5$; and
a catalyst layer formed on a surface of the intermediate layer, the catalyst layer comprising a hybrid nickel-iron hydroxide nanosheet (NiFe-ns) being a composite of a metal hydroxide and an organic substance.

* * * * *